US012626627B1

(12) United States Patent
Hsieh et al.

(10) Patent No.: US 12,626,627 B1
(45) Date of Patent: May 12, 2026

(54) DISPLAY DRIVER FOR MODULATING INITIAL VOLTAGES OF PIXEL CIRCUIT AND OPERATING METHOD THEREOF

(71) Applicant: Novatek Microelectronics Corp., Hsinchu (TW)

(72) Inventors: Yu-Lun Hsieh, Changhua County (TW); Chang-Sheng Tseng, Taoyuan City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/963,345

(22) Filed: Nov. 27, 2024

(51) Int. Cl.
*G09G 3/20* (2006.01)

(52) U.S. Cl.
CPC ....... *G09G 3/20* (2013.01); *G09G 2300/0819* (2013.01); *G09G 2310/04* (2013.01); *G09G 2310/08* (2013.01); *G09G 2320/0247* (2013.01); *G09G 2340/0435* (2013.01)

(58) Field of Classification Search
USPC .......................................................... 345/212
See application file for complete search history.

(56) References Cited

U.S. PATENT DOCUMENTS

2018/0190196 A1* 7/2018 Kwon .................... H10K 59/30
2024/0194137 A1* 6/2024 Kwon .................. G09G 3/3233
2025/0322796 A1* 10/2025 Sang .................... G09G 3/3233

FOREIGN PATENT DOCUMENTS

KR 20230084024 A * 6/2023 ........... G09G 3/3291

OTHER PUBLICATIONS

KR20230084024A (Year: 2023).*

* cited by examiner

*Primary Examiner* — Nathan P Brittingham
(74) *Attorney, Agent, or Firm* — JCIPRNET

(57) ABSTRACT

A display driver and an operating method thereof, and a display panel are disclosed. The operating method includes the following steps. The display panel includes a plurality of pixel circuits arranged in an array. By the display driver, an initial voltage with a reference value is provided to the plurality of pixel circuits during at least one active frame. By the display driver, the initial voltage with a plurality of different voltage values is provided to the plurality of pixel circuits during at least one skip frame. The plurality of different voltage values of the initial voltage respectively correspond to a plurality of distances between the plurality of display lines and the display driver.

12 Claims, 12 Drawing Sheets

DISPLAY DRIVER FOR MODULATING INITIAL VOLTAGES OF PIXEL CIRCUIT AND OPERATING METHOD THEREOF

BACKGROUND

Technical Field

This disclosure relates to an electronic device, and in particular to a display driver, an operating method thereof and a display panel.

Description of Related Art

In general, the display driver is adapted to drive the display panel. FIG. 1 is a schematic diagram of operations of a display driver according to related arts. In FIG. 1, the horizontal axis represents the operation time of the current display driver, and the vertical axis represents the voltage value.

Referring to FIG. 1, during the frames FAV and FSK, the current display driver provides signals (for example, including the voltage Vini_P1 or Vini_P2) to the display panel, for driving the pixel circuits of the display panel. However, since the provided signals have different voltage values, the coupled voltages and the hysteresis characteristics of the pixel circuits affect the working nodes therebetween. Such that, the flicker problem happens in the display panel.

SUMMARY

Embodiments of the disclosure provide an operating method of a display driver, capable of reducing the flicker problem a display panel.

The operating method of the embodiment of the disclosure is for driving a display panel, and includes the following steps. The display panel includes a plurality of pixel circuits. The pixel circuits are arranged in an array. By the display driver, an initial voltage with a reference value is provided to the plurality of pixel circuits during at least one active frame. By the display driver, the initial voltage with a plurality of different voltage values is provided to the plurality of pixel circuits during at least one skip frame. The plurality of different voltage values of the initial voltage respectively correspond to a plurality of distances between the plurality of display lines and the display driver.

The embodiment of the disclosure further provides a display driver. The display driver includes a digital-to-analog converter (DAC) and an output stage circuit. The bias voltage controller is coupled to the timing controller and a display panel. The DAC is configured to generate an initial voltage with a reference value, and to generate the initial voltage with a plurality of different voltage values according to a plurality of distances between a plurality of display lines and the display driver. The output stage circuit is coupled to the DAC and a plurality of pixel circuits arranged in the plurality of display lines. The output stage circuit is configured to output the initial voltage with the reference voltage value to the plurality of pixel circuits during at least one active frame, and to output the initial voltage with the plurality of different voltage values to the plurality of pixel circuits during at least one skip frame.

The embodiment of the disclosure further provides a display panel. The display panel includes a plurality of pixel circuits, a DAC and an output stage circuit. The pixel circuits are arranged in an array. The DAC is configured to generate an initial voltage with a reference value, and to generate the initial voltage with a plurality of different voltage values according to a plurality of distances between a plurality of display lines and the display driver. The output stage circuit is coupled to the DAC and the plurality of pixel circuits. The output stage circuit is configured to output the initial voltage with the reference voltage value to the plurality of pixel circuits during at least one active frame, and to output the initial voltage with the plurality of different voltage values to the plurality of pixel circuits during at least one skip frame.

Based on the above, in the display driver and the operating method thereof, and the display panel of the embodiment of the disclosure, by providing the initial voltage with different voltage values to the pixel circuits corresponding to various display lines, these different voltage values are compensated to the corresponding pixel circuits at various regions. As such, during the skip frame, the display driver is capable of reducing voltage differences affected to the pixel circuits, so as to reduce the flicker and to improve the uniformity of the display screen.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
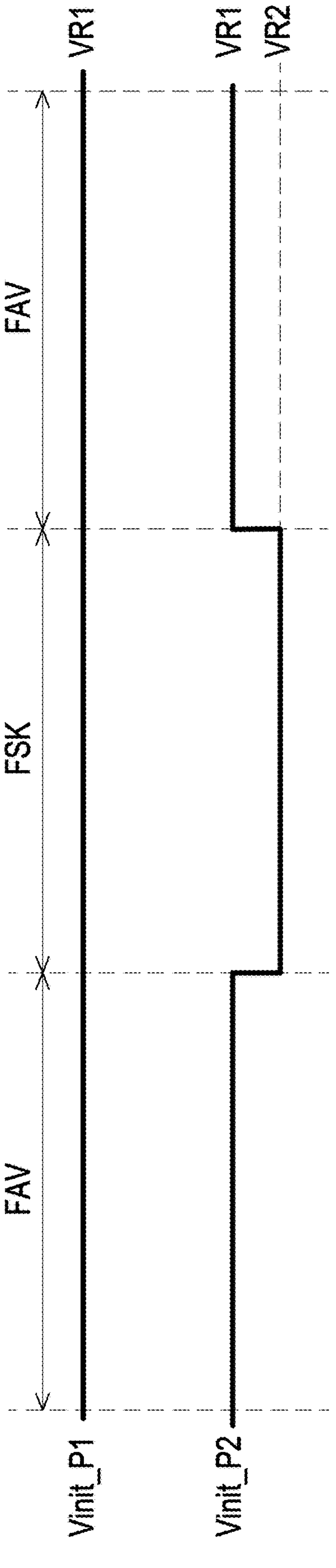
FIG. 1 (RELATED ART)
FIG. 1 is a schematic diagram of operations of a display driver according to related arts.

Some embodiments of the disclosure will be described in detail below with reference to the accompanying drawings.

The reference numerals cited in the following description will be regarded as the same or similar elements when the same reference numeral appears in different drawings. These embodiments are only part of the disclosure and do not disclose all possible implementations of the disclosure. Rather, these embodiments are merely examples within the scope of the disclosure.

Figure 2:
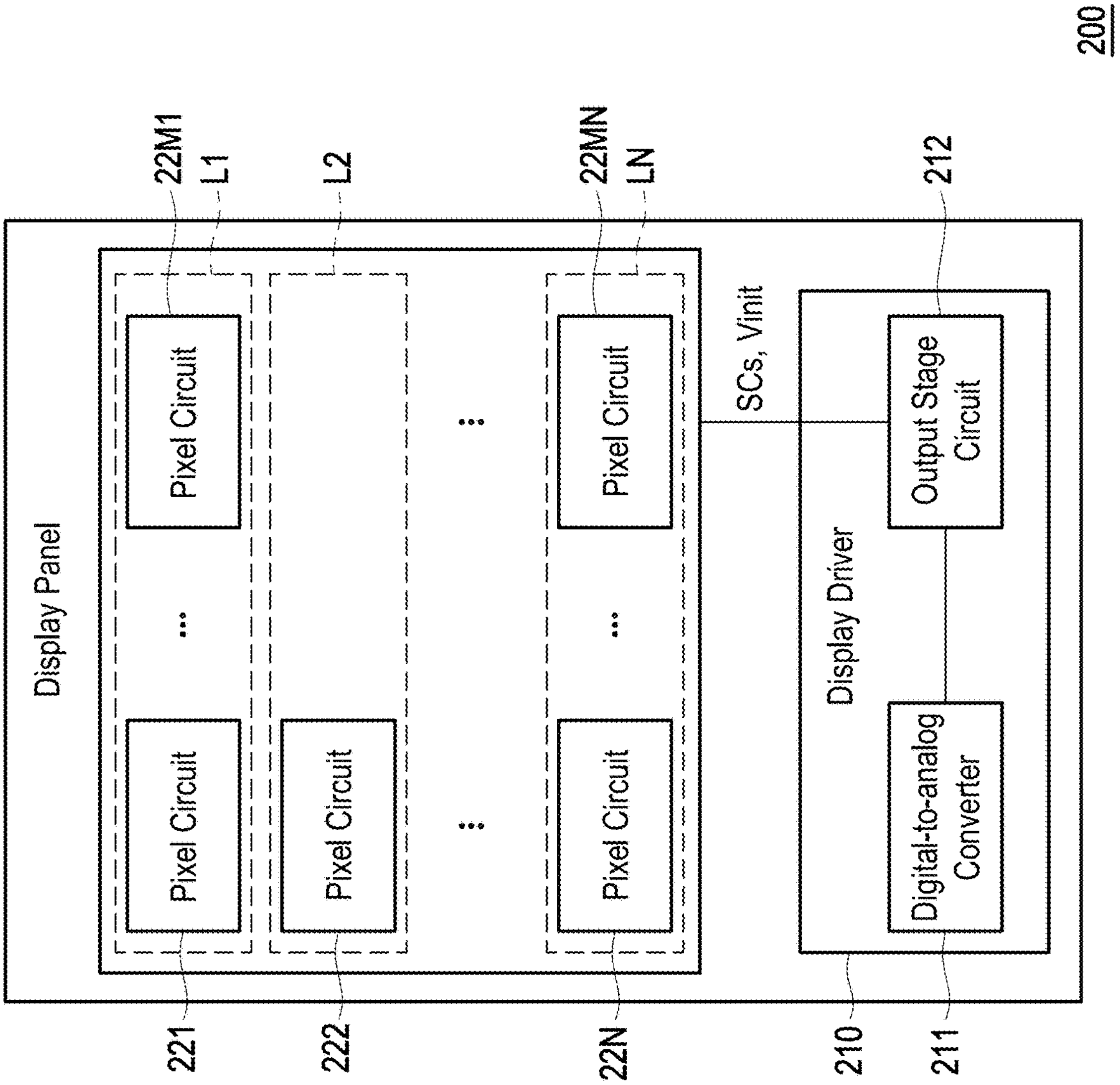
FIG. 2 is a circuit block diagram of a display panel according to an embodiment of the disclosure.

FIG. 2 is a circuit block diagram of a display panel according to an embodiment of the disclosure. Referring to FIG. 2, a display panel 200 is applied with the low temperature polycrystalline oxide (LTPO) technology. The display panel 200 includes a display driver 210 and a plurality of pixel circuits 221 to 22N and 22M1 to 22MN. N is an integer greater than 2, and M is an integer greater than 1. The pixel circuits 221 to 22N and 22M1 to 22MN are coupled to the display driver 210. The pixel circuits 221 to 22N and 22M1 to 22MN are arranged as an array, and have the same circuit architecture. The pixel circuits 221 to 22N and 22M1 to 22MN are arranged in a plurality of display lines L1 to LN. The display lines L1 to LN may correspond to various rows of the array.

In this embodiment, the display driver 210 is adapted to drive the display panel 200. The display driver 210 may be, for example, a display driver integrated circuit (DDIC). In this embodiment, the display driver 210 includes a digital-to-analog converter (DAC) 211 and an output stage circuit 212. The DAC 211 is coupled to the bias voltage controller 212. The output stage circuit 212 is coupled to the pixel circuits 221 to 22N and 22M1 to 22MN.

Figure 3:
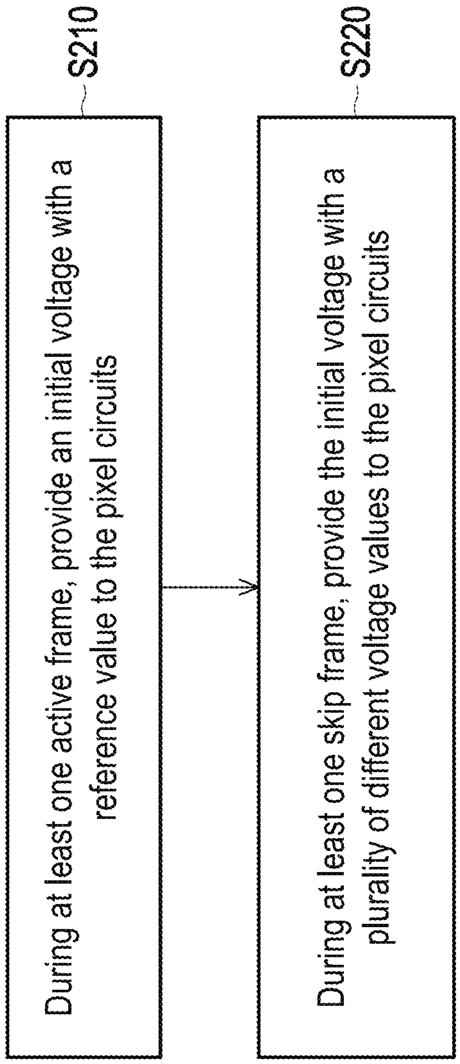
FIG. 3 is a flow chart of an operating method of the display driver according to an embodiment of the disclosure.

FIG. 3 is a flow chart of an operating method of the display driver according to an embodiment of the disclosure. Referring to FIGS. 2 and 3, the display driver 210 may execute the following steps S210 and S220. The order of these steps S210 and S220 is only for illustration and not limited thereto.

In step S210, during at least one active frame, the display driver 210 provides an initial voltage Vinit with a reference value to the pixel circuits 221 to 22N and 22M1 to 22MN. Specifically, the DAC 211 generates the initial voltage Vinit with the reference value. During the active frame, the output stage circuit 212 outputs such initial voltage Vinit to the pixel circuits 221 to 22N and 22M1 to 22MN.

In addition, during the active frame, the display driver 210 refreshes a display screen of the display panel 200 according to the initial voltage Vinit with the reference value and a plurality of controlling signals SCs.

In this embodiment, the initial voltage Vinit may be a bias signal for the pixel circuits 221 to 22N and 22M1 to 22MN. The reference value of the initial voltage Vinit may be a constant value. The controlling signals SCs may be signals for controlling the pixel circuits 221 to 22N and 22M1 to 22MN to be turned on and turned off.

Alternatively stated, during the active frame, based on the initial voltage Vinit with the reference value, the pixel circuits 221 to 22N and 22M1 to 22MN operates to refresh the current display screen according to the controlling signals SCs.

In step S220, during at least one skip frame, the display driver 210 provides the initial voltage Vinit with a plurality of different voltage values to the pixel circuits 221 to 22N and 22M1 to 22MN according to the distances between the display lines and the display driver 210. Specifically, the DAC 211 generates the initial voltage Vinit with different voltage values according to distances between the display lines L1 to LN and the display driver 210. During the skip frame, the output stage circuit 212 outputs such initial voltage Vinit to the pixel circuits 221 to 22N and 22M1 to 22MN.

Alternatively stated, during the skip frame, based on the initial voltage Vinit with different voltage values, the pixel circuits 221 to 22N and 22M1 to 22MN operates to not refresh the current display screen according to the controlling signals SCs.

In this embodiment, the different voltage values of the initial voltage Vinit may be constant values that are different from each other, and are different from the reference value in steps S210. Furthermore, the different voltage values of the initial voltage Vinit respectively correspond to distances between the display lines L1 to LN and the display driver 210. Since the display lines L1 to LN respectively correspond to various rows of the pixel circuits 221 to 22N and 22M1 to 22MN, the distances between the display lines L1 to LN and the display driver 210 are different.

For example, relative the display driver 210, the pixel circuits 221 and 22M1 arranged in the display line L1 are arranged at a far-end region of the display panel 200. The pixel circuits 22N and 22MN arranged in the display line LN are arranged at a near-end region of the display panel 200. During the skip frame, the pixel circuits 221 and 22M1 operate based on the initial voltage Vinit with one voltage value corresponding to the display line L1. During the skip frame, the pixel circuits 22N and 22MN operate based on the initial voltage Vinit with another voltage value corresponding to the display line LN.

It is worth mentioning that, since the different voltage values of the initial voltage Vinit correspond to various distances between the display lines L1 to LN and the display driver 210, these different voltage values may be respectively compensated to the pixel circuits 221 to 22N and 22M1 to 22MN that are arranged in these display lines L1 to LN. Therefore, based on the compensated voltages, the pixel circuits 221 to 22N and 22M1 to 22MN among various regions (e.g., the near-end region and the far-end region) of the display panel 200 operate during the skip frame. As such, during the skip frame, the display driver 210 is capable of reducing loadings of pixel circuits 221 to 22N and 22M1 to 22MN caused by voltage differences between different frames and by distances between the display lines L1 to LN and the display driver 210. Thereby, with the reduced loading, the display driver 210 is capable of avoiding working nodes in the pixel circuits 221 to 22N and 22M1 to 22MN being affected, so as to reduce the flicker, and the uniformity of the display screen is improved accordingly.

Figure 4:
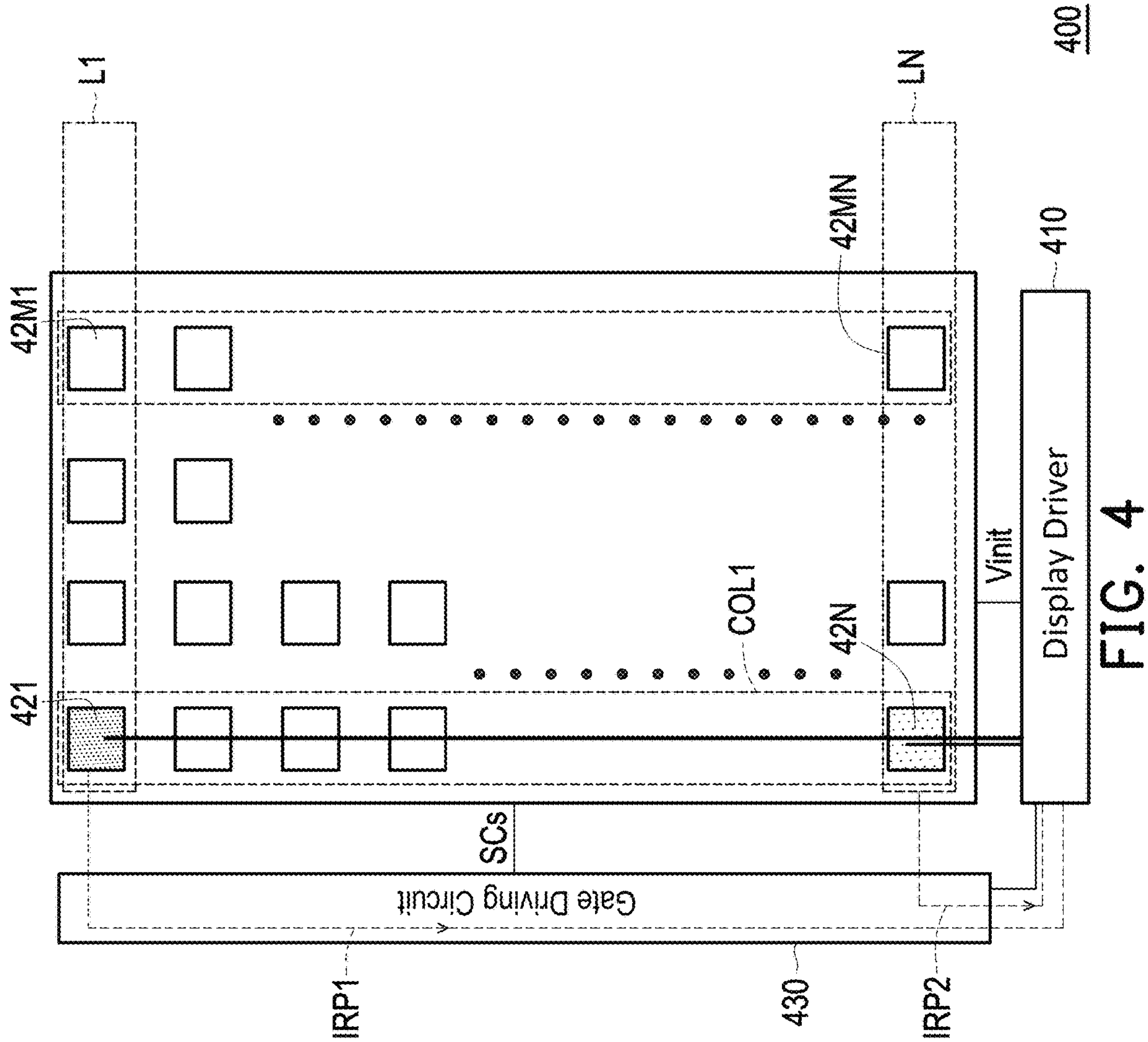
FIG. 4 is a circuit block diagram of a display panel according to another embodiment of the disclosure.

FIG. 4 is a circuit block diagram of a display panel according to another embodiment of the disclosure. Referring to FIG. 4, a display panel 400 includes a display driver 410 and a plurality of pixel circuits 421 to 42N and 42M1 to 42MN. N is an integer greater than 4, and M is an integer greater than 3. The display driver 410 and the pixel circuits 421 to 42N and 42M1 to 42MN may be described with reference to and by analogy with the display panel 200.

In the embodiment of FIG. 4, the display panel 400 further includes a gate driving circuit 430. The gate driving circuit 430 is coupled to the display driver 410 and the pixel circuits 421 to 42N and 42M1 to 42MN. The gate driving circuit 430 outputs the plurality of controlling signals SCs to the pixel circuits 421 to 42N and 42M1 to 42MN, for controlling the pixel circuits 421 to 42N and 42M1 to 42MN to be turned on and turned off. The gate driving circuit 430 may be a gate driver on array (GOA). In another embodiment, the gate driving circuit 430 may be integrated with the display driver 410.

Figure 5:
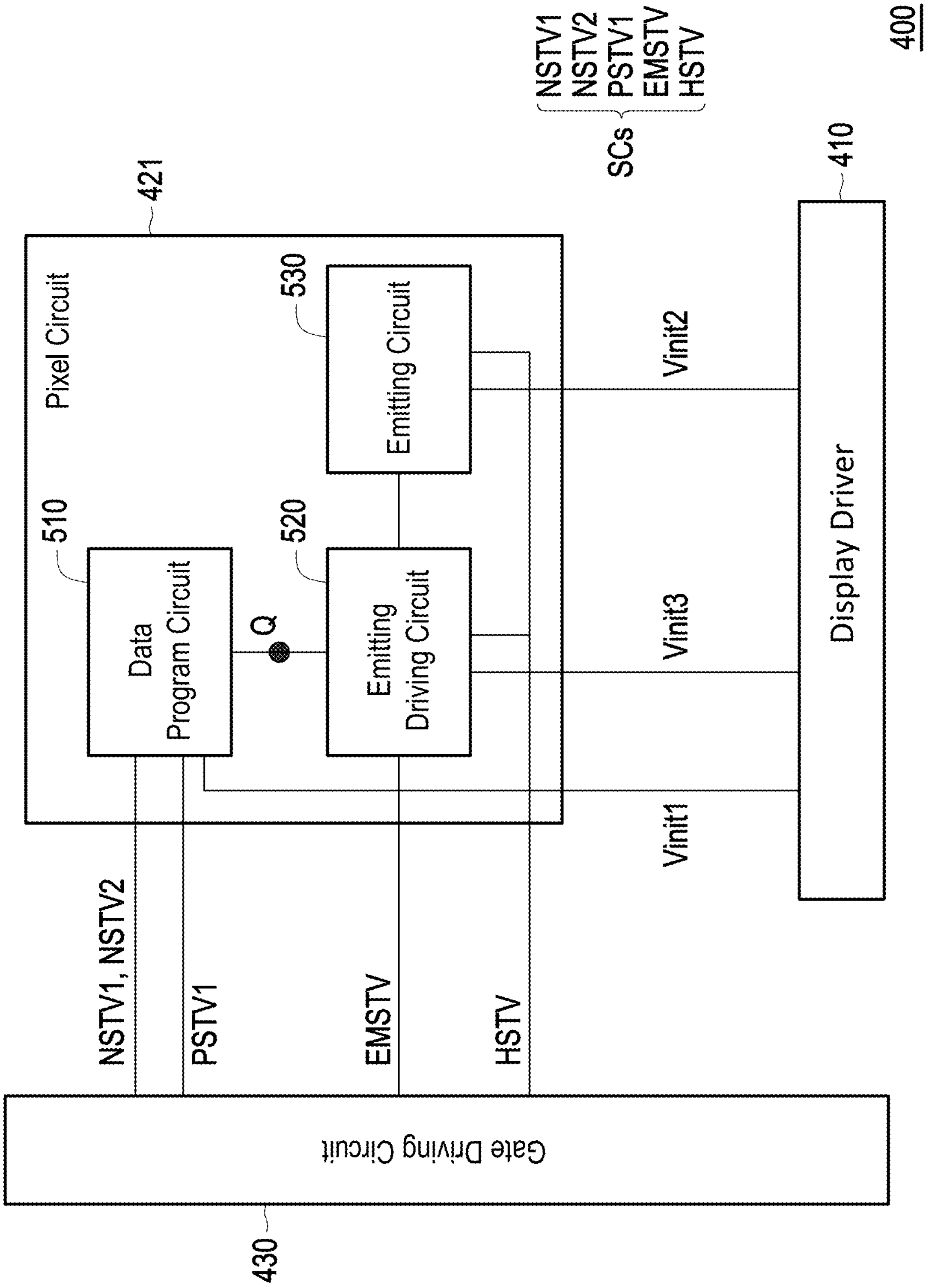
FIG. 5 is a circuit block diagram of a pixel circuit of the display panel according to the embodiment of FIG. 4 of the disclosure.

Referring to FIG. 4 and FIG. 5, FIG. 5 is a circuit block diagram of a pixel circuit of the display panel according to the embodiment of FIG. 4 of the disclosure. In FIG. 5, one of the pixel circuits 421 to 42N and 42M1 to 42MN (e.g., the pixel circuit 421) is illustrated, and the others thereof are omitted. The others of the pixel circuits 422 to 42N and 42M1 to 42MN may be described with reference to and by analogy with the pixel circuit 421.

In the embodiment of FIG. 5, the pixel circuit 421 includes a data program circuit 510, an emitting driving circuit 520 and an emitting circuit 530. The data program circuit 510 is coupled to the gate driving circuit 430 for receiving multiple controlling signals PSTV1, NSTV1 and NSTV2 of the controlling signals SCs. The data program circuit 510 is coupled to the display driver 410 for receiving an initial voltage Vinit1. The data program circuit 510 processes display data at a node Q according to the controlling signals NSTV1, NSTV2 and PSTV1 and the initial voltage Vinit1. The node Q may be the working node of the pixel circuit 421 as discussed in the embodiments of FIGS. 2 and 3.

In this embodiment, the emitting driving circuit 520 is coupled to the data program circuit 510 at the node Q. The emitting driving circuit 520 is coupled to the gate driving circuit 430 for receiving multiple controlling signals EMSTV and HSTV of the controlling signals SCs. The emitting driving circuit 520 is coupled to the display driver 410 for receiving an initial voltage Vinit3. Based on the display data at the node Q, the emitting driving circuit 520 drives the emitting circuit 530 according to the controlling signals EMSTV and HSTV and the initial voltage Vinit3.

In this embodiment, the emitting circuit 530 is coupled to the emitting driving circuit 520. The emitting circuit 530 is coupled to the gate driving circuit 430 for receiving the controlling signal HSTV. The emitting circuit 530 is coupled to the display driver 410 for receiving an initial voltage Vinit2. The emitting circuit 530 emits a corresponding light according to the controlling signal HSTV and the initial voltage Vinit2.

It should be noted that, since the display panel 400 operates in various frames (e.g., the active frame the skip frame) for refreshing and not refreshing the current display screen, when the display panel 400 switches from one frame to another different frame, at least one of the controlling signals NSTV1, NSTV2 and PSTV1 and the initial voltages Vinit1 to Vinit3 have voltage differences between these frames. In each one of the pixel circuits (e.g., the pixel circuit 421), the voltage differences in the data program circuit 510 and the emitting driving circuit 520 may be coupled to the working node Q.

In addition, since the distances between the pixel circuits 421 to 42N and 42M1 to 42MN and display driver 410 are different, these pixel circuits 421 to 42N and 42M1 to 42MN at the same corresponding nodes (e.g., the node Q) have voltage differences. In each one of the pixel circuits (e.g., the pixel circuit 421), such voltage differences may also be coupled to the working node Q.

For example, relative to the display driver 410, the pixel circuit 421 arranged in the display line L1 is arranged at a far-end region of the display panel 400, and the pixel circuit 42N arranged in the display line LN is arranged at a near-end region of the display panel 400. During various frames, a current from the pixel circuit 421 may be flowed along an IR path IRP1, and a current from the pixel circuit 42N may be flowed along an IR path IRP2. Since the IR paths IRP1 and IRP2 are different, the IR drop of the pixel circuit 421 and the IR drop of the pixel circuit 42N are different, such that the same corresponding nodes (e.g., the node Q) of these pixel circuits 421 and 42N have different coupled voltages.

Take the pixel circuit 421 as an example, the voltage at the node Q affects the operations of data program circuit 510 and the emitting driving circuit 520, so as to affect the corresponding light emitted by the emitting circuit 530. In order to compensate the different voltages at the nodes Q among the pixel circuits 421 to 42N and 42M1 to 42MN, the display driver 410 provides at least one of the initial voltages Vinit1 to Vinit3 that has stepped voltage values during one of the various frames (e.g., the skip frame).

Figure 6:
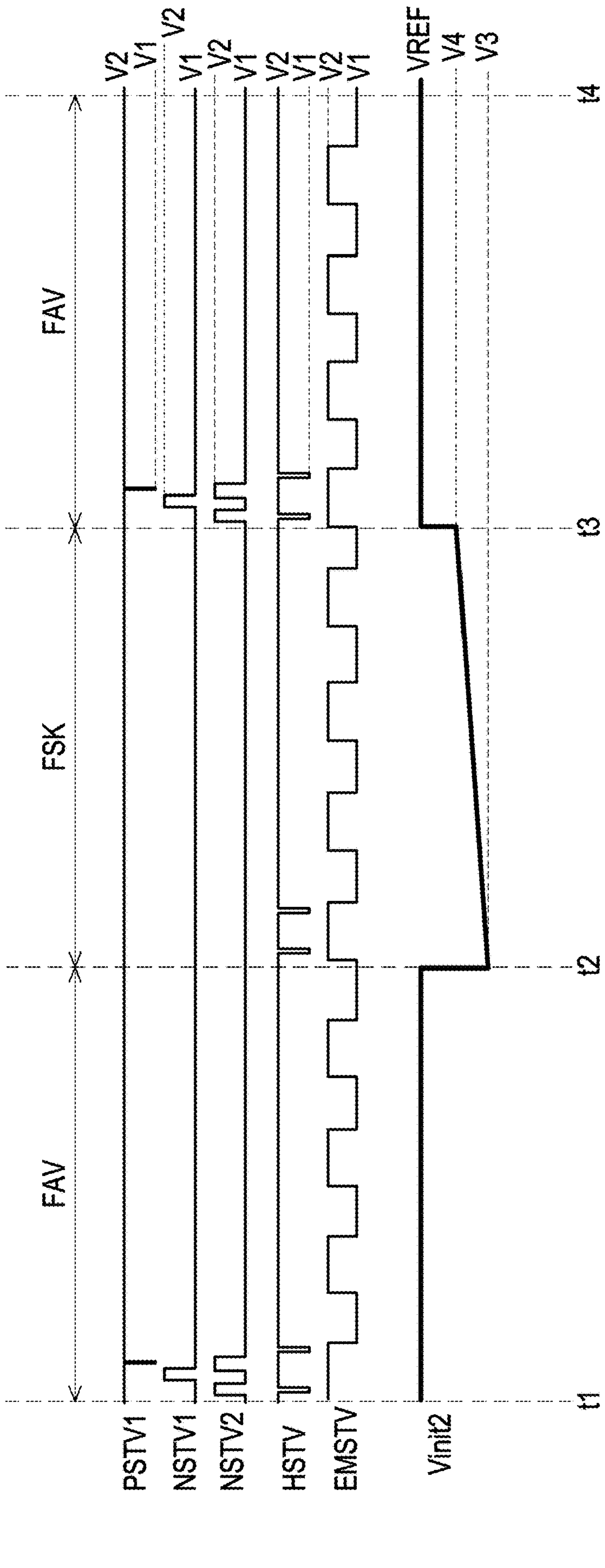
FIG. 6 is a schematic diagram of operations of the display panel according to the embodiment of FIG. 5 of the disclosure.

Referring to FIGS. 4 to 6, FIG. 6 is a schematic diagram of operations of the display panel according to the embodiment of FIG. 5 of the disclosure. In FIG. 6, the horizontal axis represents the operation time of the display panel 400, and the vertical axis represents the voltage value. The initial voltages Vinit1 and Vinit3 are omitted in FIG. 6. The initial voltages Vinit1 and Vinit3 may be the same as the initial voltage Vinit2, and may be described with reference to and by analogy with the initial voltage Vinit2.

In the embodiment of FIG. 6, the display panel 400 operates during the active frame FAV (e.g., from time t1 to t2) according to the controlling signals PSTV1, NSTV1, NSTV2, HSTV and EMSTV and the initial voltages Vinit1 to Vinit3, to refresh the current display screen.

Specifically, during the active frame FAV (i.e., from time t1 to t2), the controlling signals PSTV1, NSTV1 and NSTV2 respectively have at least one pulse switched between voltage values V1 and V2. During such active frame FAV, the controlling signal HSTV has pulses switched between voltage values V1 and V2, and the controlling signal EMSTV may be a pulse signal switched between voltage values V1 and V2. During such active frame FAV, the initial voltage Vinit2 may be a constant voltage with the reference value VREF.

In this embodiment, the voltage value V1 may be a power low voltage value. The voltage value V2 may be a power high voltage value. The reference value VREF may be another power low voltage value that is different from the voltage value V1.

As such, during the active frame FAV (i.e., from time t1 to t2), the data program circuit 510 starts to write the display data at the node Q according to the pulses of the controlling signals PSTV1, NSTV1 and NSTV2, based on the initial voltage Vinit1 with the reference value VREF. During such active frame FAV, the emitting driving circuit 520 and the emitting circuit 530 start to reset the electronic elements (e.g., transistors) thereof according to the pulses of the controlling signal HSTV, based on the initial voltages Vinit3 and Vinit2 with the reference value VREF. Then, the emitting driving circuit 520 starts to drive the emitting circuit 530 according to the controlling signal EMSTV, based on the initial voltage Vinit3 with the reference value VREF, such that the emitting circuit 530 emits the corresponding light based on the initial voltage Vinit2 with the reference value VREF, to refresh the current display screen.

Continuously, the display panel 400 operates during the skip frame FSK (e.g., from time t2 to t3) according to the controlling signals PSTV1, NSTV1, NSTV2, HSTV and EMSTV and the initial voltages Vinit1 to Vinit3, to keep displaying the current display screen and do not refreshing the current display screen.

Specifically, during the skip frame FSK (i.e., from time t2 to t3), the controlling signal PSTV1 may be a constant voltage with the voltage value V2, and the controlling signals NSTV1 and NSTV2 may respectively be constant voltages with the voltage value V1. During such skip frame FSK, the controlling signals HSTV and EMSTV may respectively be the same as the controlling signals HSTV and EMSTV during the active frame FAV.

In addition, during such skip frame FSK, the initial voltage Vinit2 may be stepped voltages switched from a voltage value V3 to a voltage value V4. In detail, at time t2, the initial voltage Vinit2 is switched from the reference value VREF to the voltage value V3 to generate a falling edge. From time t2 to time t3, the voltage values of the initial voltage Vinit2 increases gradually and digitally from the voltage value V3 to the voltage value V4, such that the initial voltage Vinit2 may be an approximately slope line. At time t3, the initial voltage Vinit2 is switched from the voltage value V4 to the reference value VREF to generate a rising edge.

In this embodiment, during the skip frame FSK (e.g., at time t2), the display driver 410 provides the initial voltage Vinit2 with the voltage value V3 to the pixel circuit 421 arranged in the display line L1. During the same skip frame FSK (e.g., at time t3), the display driver 410 provide the initial voltage Vinit2 with another voltage value V4 to the pixel circuit 42N arranged in the display line LN. The pixel circuit 421 and the pixel circuit 42N are arranged in the same column COL1 and different rows. These rows correspond to the display lines L1 and LN respectively, which further correspond to the far-end region and the near-end region corresponding to the display driver 410 respectively.

Continued with the above description, the voltage value V3 arranged in the display line L1. The voltage value V4 arranged in the display line LN. The voltage values V3 and V4 are different from the reference value VREF. The voltage values V3 and V4 are different from each other based on the row arrangement of the display lines L1 to LN. Specifically, a distance between the display line L1 and the display driver 410 is greater than a distance between the display line LN and the display driver 410.

In this embodiment, the display panel 400 may operates during another active frame FAV (e.g., from time t3 to t4) and another skip frame FSK repeatedly.

Figure 7:
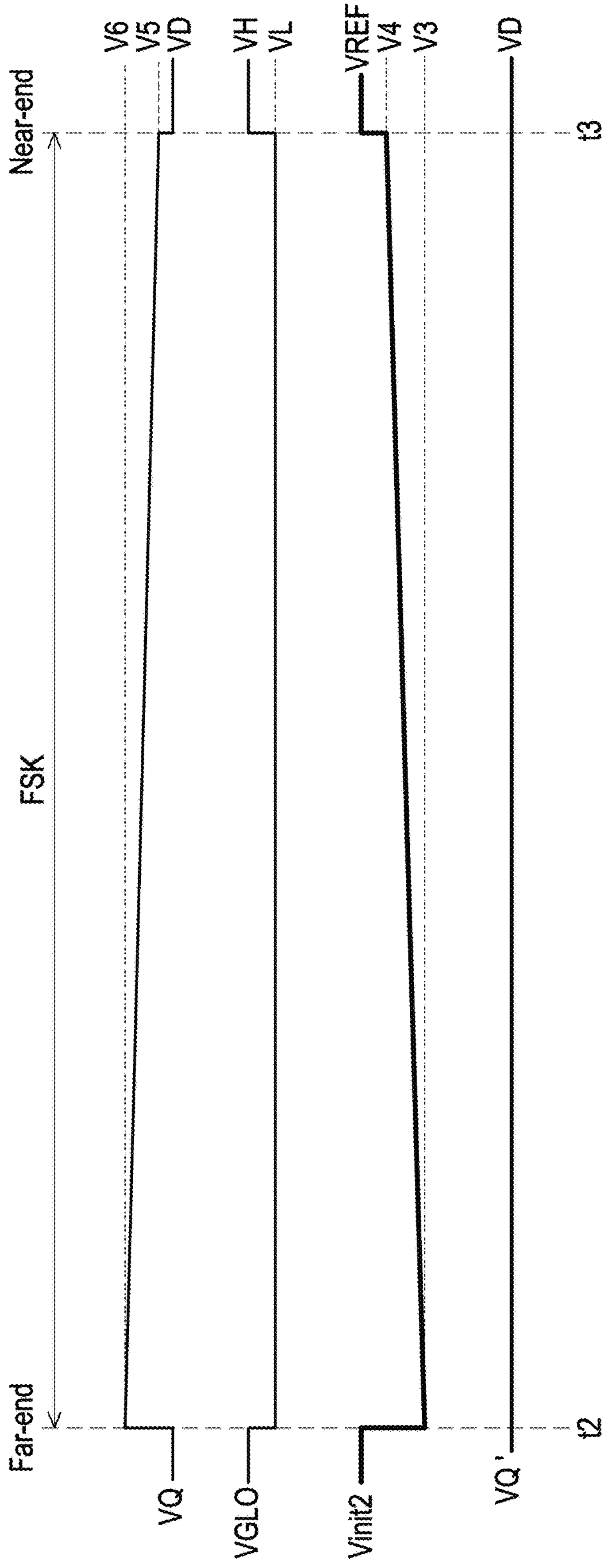
FIG. 7 is a schematic diagram of operations of the display panel during the skip frame according to the embodiment of FIG. 5 of the disclosure.

FIG. 7 is a schematic diagram of operations of the display panel during the skip frame according to the embodiment of FIG. 5 of the disclosure. Referring to FIGS. 5 to 7, the display panel 400 operates during the skip frame FSK (i.e., from time t2 to t3), to illustrate how the node Q of the pixel circuit 421 is compensated by the initial voltage Vinit2 with different voltage values (e.g., the voltage values V3 and V4). In FIG. 7, the horizontal axis represents the operation time of the display panel 400, and the vertical axis represents the voltage value.

In the embodiment of FIG. 7, during the skip frame FSK (i.e., from time t2 to t3), a signal VGLO illustrates a difference of the controlling signal NSTV1 or NSTV2 between the active frame FAV and the skip frame FSK. The signal VGLO is switched from a voltage value VH to a voltage value VL at time t2, and is switched back to the voltage value VH at time t3. In this embodiment, a voltage difference between the voltage values VH and VL may include the voltage difference between the voltage values V1 and V2 of the controlling signal NSTV1 or NSTV2, and the IR loading of the pixel circuit 421.

As such, during the skip frame FSK (i.e., from time t2 to t3), based on the signal VGLO, a voltage VQ at the node Q decreased gradually from a voltage value V6 to a voltage value V5. At time t3, entering the next active frame, the voltage VQ is switched from the voltage value V5 to a voltage value VD. The voltage value VD may be a correct voltage value written at the node Q during the skip frame FSK. During the skip frame FSK, the voltage VQ with the voltage value VD is affected by a disturbance of the signal VGLO, to cause the coupled voltage. Such coupled voltage may be the voltage value V5 or V6, which depends on the row arrangement of the corresponding display lines L1 to LN.

In this embodiment, during the skip frame FSK (i.e., from time t2 to t3), by providing the initial voltage Vinit2 with different voltage values (e.g., including the voltage values V3 and V4), the voltage difference illustrated in the signal VGLO is compensated to the node Q. As such, a voltage VQ' at the node Q that has compensated may be a constant voltage with the voltage value VD. Therefore, the emitting driving circuit 520 and the emitting circuit 530 may operate based on the voltage VQ' with the constant voltage value VD, to maintain the same brightness of the pixel circuit 421 during the same frame. The voltage VQ' with the constant voltage value VD indicates a consistence of the brightness.

It should be noted that, during the skip frame FSK (i.e., from time t2 to t3), absolute values of the different voltage values of the initial voltage Vinit2 and the distances between the display lines L1 to LN and the display driver 410 have a positive correlation. Alternatively sated, from the far-end region to the near-end region of the display panel 400, absolute values of these voltage values of the initial voltage Vinit2 are stepped decreased.

For example, regarding the pixel circuit 421 arranged at the far-end region, relative to the pixel circuit 42N arranged at the near-end region, based on the greater distance between the display line L1 and the display driver 410, the absolute value of the voltage value V3 is greater than the absolute value of the voltage value V4.

Figure 8:
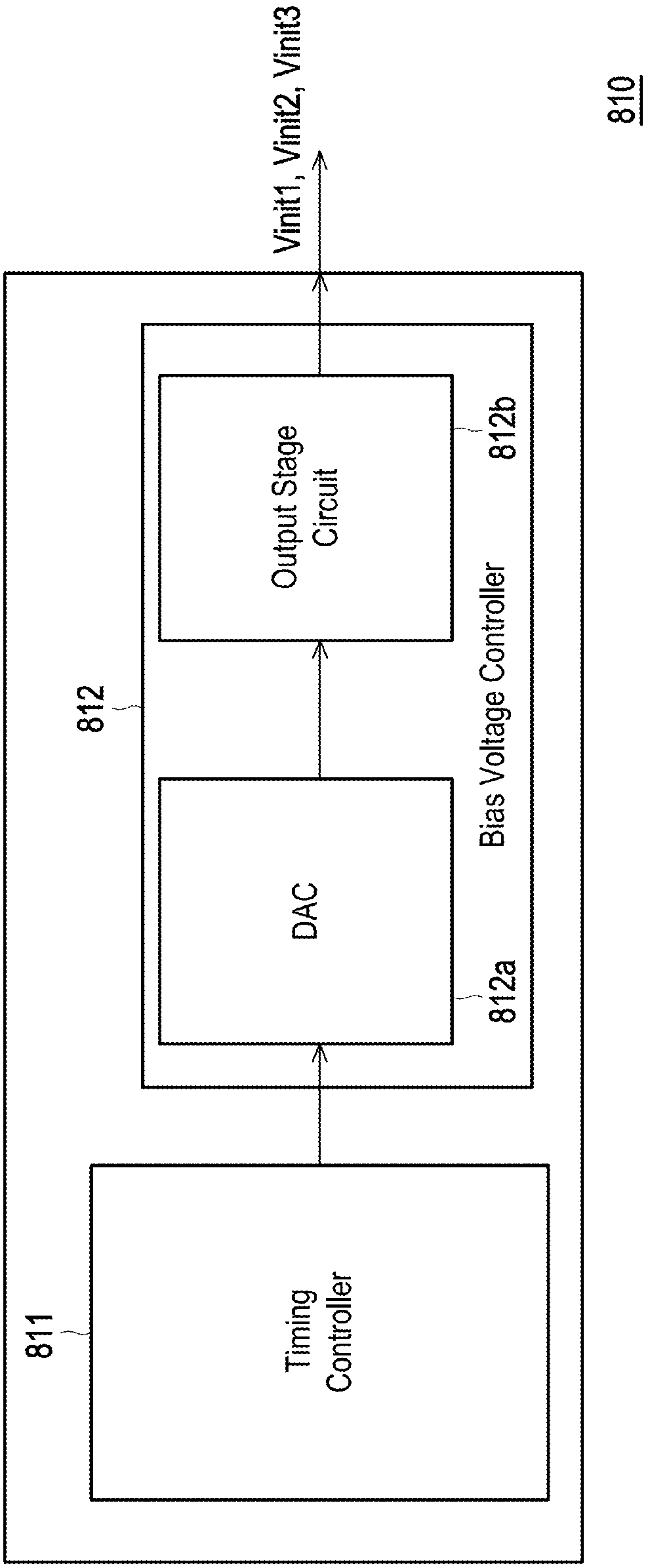
FIG. 8 is a circuit block diagram of a display driver according to an embodiment of the disclosure.

FIG. 8 is a circuit block diagram of a display driver according to an embodiment of the disclosure. Referring to FIG. 8, a display driver 810 may be adapted to drive a display panel (e.g., the display panel 400 shown in FIG. 4). The display driver 810 includes a timing controller 811 and a bias voltage controller 812. The timing controller 811 and the bias voltage controller 812 may be described with reference to and by analogy with the display driver 210 or 410.

In the embodiment of FIG. 8, the bias voltage controller 812 includes a digital-to-analog converter (DAC) 812*a* and an output stage circuit 812*b*. The DAC 812*a* is coupled to the timing controller 811 and the output stage circuit 812*b*. The output stage circuit 812*b* is coupled to the pixel circuits (e.g., the pixel circuits 421 to 42N and 42M1 to 42MN shown in FIG. 4).

Figure 9:
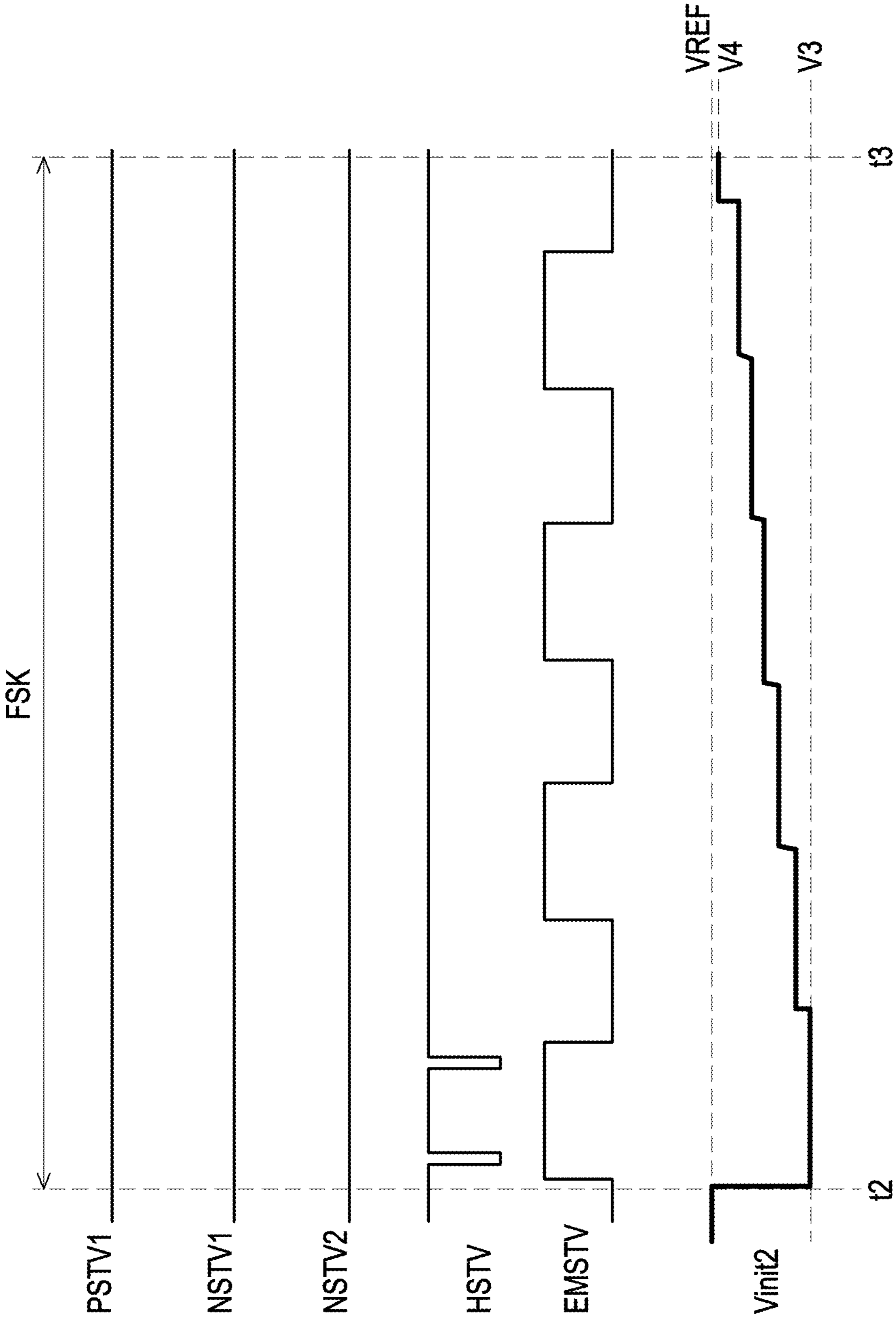
FIG. 9 is a schematic diagram of operations of the display driver according to the embodiment of FIG. 8 of the disclosure.

Referring to FIGS. 8 and 9, FIG. 9 is a schematic diagram of operations of the display driver according to the embodiment of FIG. 8 of the disclosure. In FIG. 9, the horizontal axis represents the operation time of the display driver 810, and the vertical axis represents the voltage value. Compared with the embodiment of FIG. 6, in FIG. 8, the initial voltage Vinit 2 may be a voltage with stepped voltage values switched form the voltage value V3 to the voltage V4.

In this embodiment, based on the clock signal (not shown) output from the timing controller 811, the DAC 812*a* modulates the different voltage values of the initial voltage Vinit 2 according to a row arrangement of the display lines (e.g., the display lines L1 to LN shown in FIG. 4), to generate the initial voltage Vinit 2 with different voltage values (including, the voltage values V3 and V4). During the skip frame, the output stage circuit 812*b* outputs the initial voltage Vinit2 with the different voltage values to the pixel circuits.

In this embodiment, based on the clock signal output from the timing controller 811, the DAC 812*a* provides the initial voltage Vinit 2 with the reference value VREF. During the active frame, the output stage circuit 812*b* outputs the initial voltage with the reference value VREF to the pixel circuits.

In this embodiment, the DAC 812*a* and the output stage circuit 812*b* process the initial voltages Vinit1 and Vinit3, which may be described with reference to and by analogy with the aforesaid initial voltage Vinit2.

Figure 10:
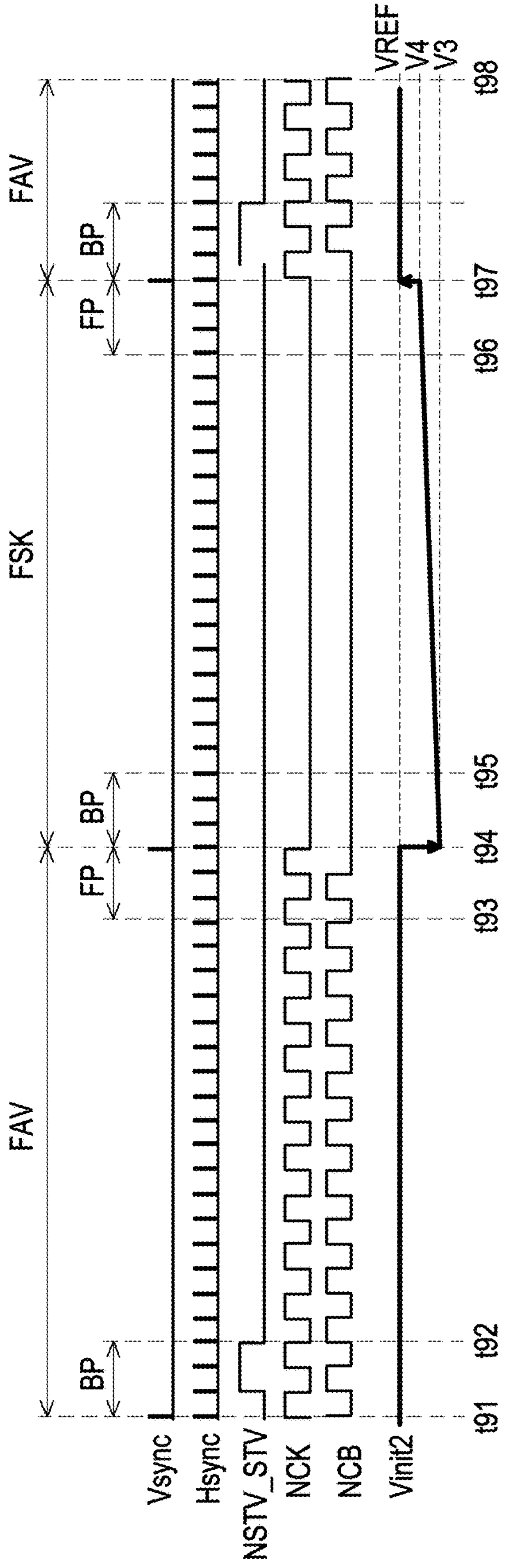
FIG. 10 is a schematic diagram of operations of the display panel according to another embodiment of the disclosure.

FIG. 10 is a schematic diagram of operations of the display panel according to another embodiment of the disclosure. Referring to FIGS. 4 and 9, the display driver 410 of the display panel 400 operates during an operating period. In FIG. 10, the horizontal axis represents the operation time of the display panel 400, and the vertical axis represents the voltage value.

In the embodiment of FIG. 10, among the operating period, a number of the active frame FAV is plural (e.g., two), and a number of the skip frame FSK is one. The skip frame FSK is between these two active frames FAV.

Specifically, during the active frame FAV (i.e., from time t91 to time t94), the display driver 410 provides multiple starting signals NSTV_STV, NCK and NCB to enable the controlling signals (e.g, the controlling signals NSTV1 and NSTV2 shown in FIG. 5). During such active frame FAV, the display driver 410 provides multiple synchronization signals Vsync and Hsync to synchronizes the signals operated in the display panel 400.

During the active frame FAV (i.e., from time t91 to time t94), the starting signal NSTV_STV has a pulse during a back porch (i.e., from time t91 to time t92), and may be a constant voltage after the back porch (i.e., from time t92 to time t94). During such active frame FAV, the starting signals NCK and NCB respectively are pulse signals that have reverse phases. During such active frame FAV, the initial voltage Vinit2 is the constant voltage with the reference value VREF.

As such, during the active frame FAV (i.e., from time t91 to time t94), display driver 410 drives the display panel 400 according to the synchronization signals Vsync and Hsync, the starting signals NSTV_STV, NCK and NCB, the controlling signals SCs and the initial voltage Vinit (including the initial voltage Vinit2), to refresh the current display screen.

Continuously, during the skip frame FSK (i.e., from time t94 to time t97), the starting signals NSTV_STV, NCK and NCB respectively are constant voltages. During such skip frame FSK, the initial voltage Vinit2 increased gradually from the voltage value V3 to the voltage value V4, as described in the embodiments of FIGS. 6 and 7.

As such, during the skip frame FSK (i.e., from time t94 to time t97), display driver 410 drives the display panel 400 according to the synchronization signals Vsync and Hsync, the starting signals NSTV_STV, NCK and NCB, the controlling signals SCs and the initial voltage Vinit (including the initial voltage Vinit2), to not refresh the current display screen.

It should be noted that, in different frames FAV and FSK, the display driver 410 sets the initial voltage Vinit2 with different patterns that are independent from each other. In addition, during the skip frame FSK, based on the initial voltage Vinit2 with various voltage values, the display driver 410 is capable of compensating the difference voltages of the pixel circuits. The aforesaid difference voltages regard the corresponding nodes Q of the far-end region and the near-end region of the display panel 400.

Figure 11:
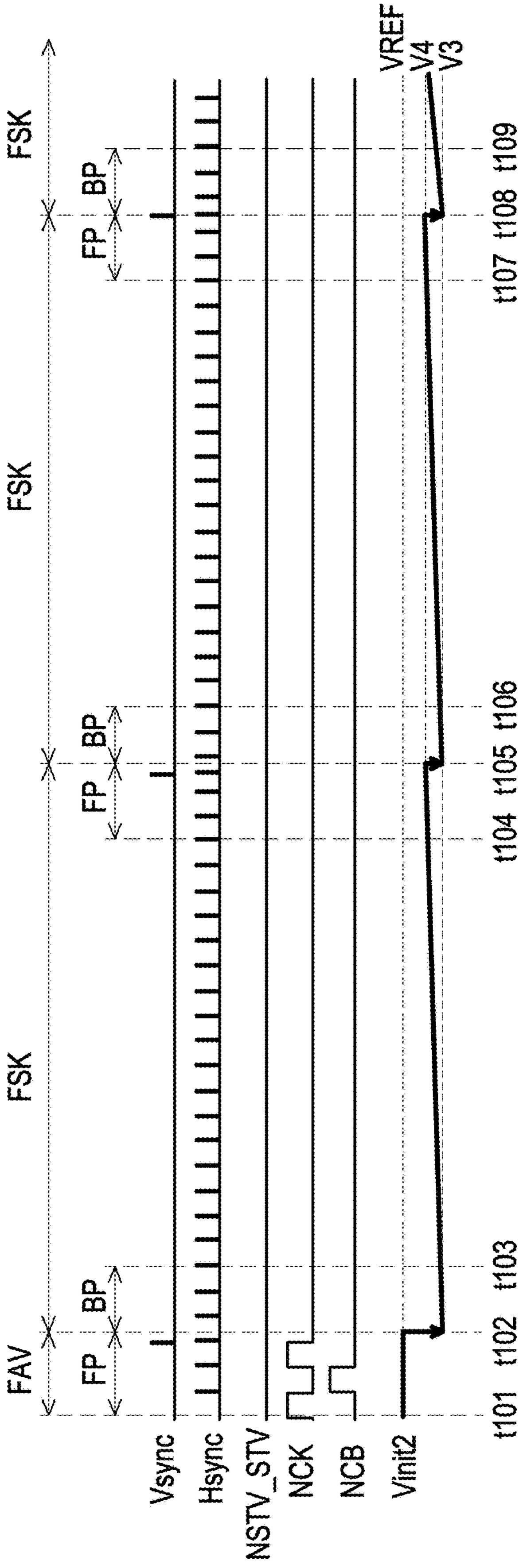
FIG. 11 is a schematic diagram of operations of the display panel according to another embodiment of the disclosure.

FIG. 11 is a schematic diagram of operations of the display panel according to another embodiment of the disclosure. Referring to FIGS. 4 and 10, the display driver 410 of the display panel 400 operates during an operating period. In FIG. 11, the horizontal axis represents the operation time of the display panel 400, and the vertical axis represents the voltage value.

Relative to the embodiment of FIG. 10, in the embodiment of FIG. 11, among the operating period, a number of the active frame FAV is one, and a number of the skip frame FSK is plural (e.g., three). The skip frames FSK (i.e., from time t102 to time t109) are continuous and after the active frame FAV (i.e., from time t101 to time t102).

Figure 12:
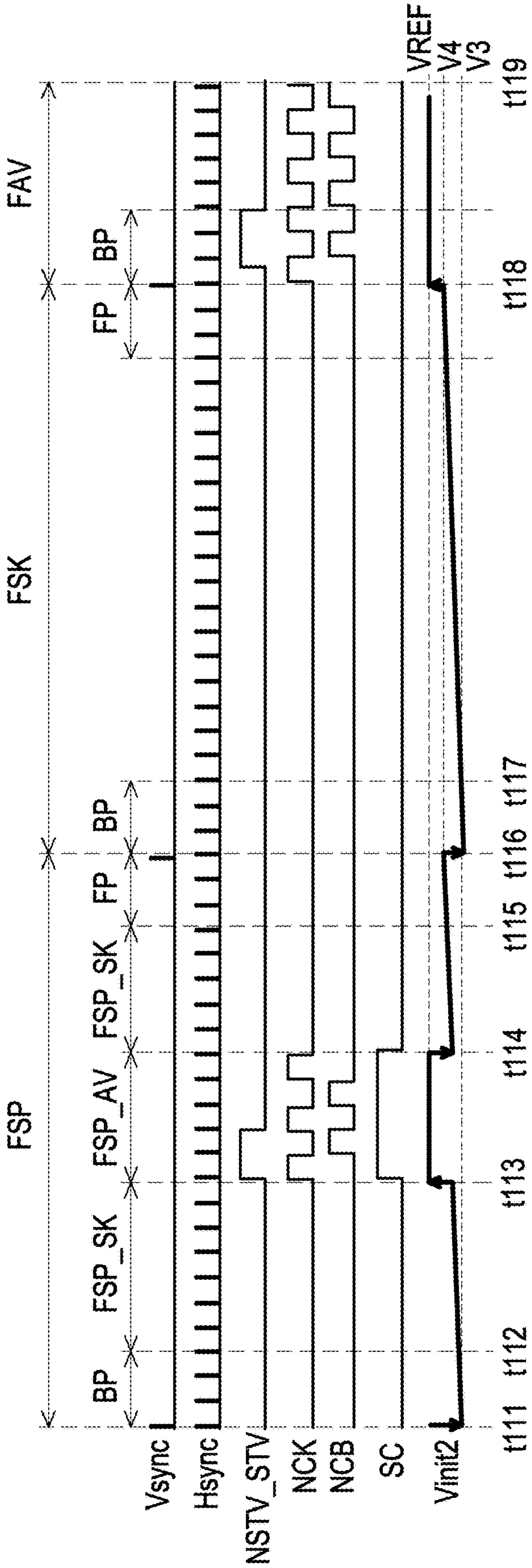
FIG. 12 is a schematic diagram of operations of the display panel according to another embodiment of the disclosure.

FIG. 12 is a schematic diagram of operations of the display panel according to another embodiment of the disclosure. Referring to FIGS. 4 and 11, the display driver 410 of the display panel 400 operates during an operating period. In FIG. 12, the horizontal axis represents the operation time of the display panel 400, and the vertical axis represents the voltage value.

Relative to the embodiment of FIG. 10, in the embodiment of FIG. 12, the operating period includes at least one split-screen frame FSP, at least one active frame FAV and at least one skip frame FSK. In this embodiment, among the operating period, a number of the split-screen frame FSP is one, a number of the active frame FAV is one, and a number of the skip frame FSK is one. The skip frame FSK (i.e., from time t116 to time t118) is after the split-screen frame FSP (i.e., from time t111 to time t116), and is before the active frame FAV (i.e., from time t118 to time t119).

Furthermore, the split-screen frame FSP include one or multiple split-screen skip frames FSP_SK, and one or multiple split-screen active frames FSP_AV. In this embodiment, among the operating period, a number of the split-screen active frame FSP_AV is one, and a number of the split-screen skip frame FSP_SK is plural (e.g., two). The split-screen active frame FSP_AV is between these two split-screen skip frames FSP_SK.

Specifically, during a split-screen skip frame FSP_SK (i.e., from time t112 to time t113) of the split-screen frame FSP, the display driver 410 provides the initial voltage Vinit2 with a plurality of different split-values to first pixel circuits of the pixel circuits 421 to 42N and 42M1 to 42MN. The first pixel circuits are arranged in first display lines of the display lines L1 to LN. For example, the first pixel circuit are arranged at the far-end region of the display panel 400, and include the pixel circuit 421 arranged in the display line L1.

In this embodiment, the different split-values of the initial voltage Vinit2 are between the voltage values V3 and V4. The different split-values of the initial voltage Vinit2 respectively correspond to distances between the display lines L1 to LN and the display driver 410. Since the display lines L1 to LN respectively correspond to various rows of the array, distances between the first display lines and the display driver 410 are different.

As such, during the split-screen skip frame FSP_SK (i.e., from time t112 to time t113), based on the initial voltage Vinit2 with different split-values, some of the pixel circuits (e.g., including the pixel circuit 421) operates to not refresh a first part of the current display screen according to the controlling signals SCs. The first part of the current display screen corresponds to the first pixel circuits (e.g., including the pixel circuit 421).

Continuously, during the split-screen active frame FSP_AV (i.e., from time t113 to time t114) of the split-screen frame FSP, the display driver 410 provides the initial voltage Vinit2 with the reference voltage VREF to the first pixel circuits. As such, during such split-screen active frame FSP_AV, the display driver 410 refreshes the first part of the display screen corresponding to the first pixel circuits according to the initial voltage Vinit2 with the reference value VREF and the plurality of controlling signals SCs.

Alternatively stated, during such split-screen active frame FSP_AV, based on the initial voltage Vinit2 with the reference value VREF, some of the pixel circuits (e.g., including the pixel circuit 421) operates to refresh the corresponding part of the current display screen according to the controlling signals SCs.

Continuously, during another split-screen skip frame FSP_SK (i.e., from time t114 to time t115), the display driver 410 provides the initial voltage Vinit2 with other different split-values to second pixel circuits of the pixel circuits 421 to 42N and 42M1 to 42MN. The second pixel circuits are arranged in second display lines of the display lines L1 to LN. For example, the second pixel circuit are arranged at the near-end region of the display panel 400, and include the pixel circuit 42N arranged in the display line LN.

In this embodiment, the other different split-values of the initial voltage Vinit2 are between the voltage values V3 and V4. These different split-values of the initial voltage Vinit2 respectively correspond to the second display lines (e.g., including the display line LN), and are different from the different split-values of the initial voltage Vinit2 during the earlier split-screen skip frame FSP_SK (i.e., from time t112 to time t113).

Alternatively stated, during the foresaid two split-screen skip frames FSP_SK, various voltage values of the initial voltage Vinit2 are the same as the corresponding different voltage values of initial voltage Vinit2 shown in FIG. 6 or 7.

As such, during the split-screen skip frame FSP_SK (i.e., from time t114 to time t115), based on the initial voltage Vinit2 with other different split-values, some of the pixel circuits (e.g., including the pixel circuit 42N) operates to not refresh a second part of the current display screen according to the controlling signals SCs. The second part of the current display screen corresponds to the second pixel circuits (e.g., including the pixel circuit 42N).

It should be noted that, in different split-screen frames FSP_AV and FSP_SK, the display driver 410 sets the initial voltage Vinit2 with different patterns that are independent from each other. In addition, during the split-screen skip frame FSP_SK, based on the initial voltage Vinit2 with various voltage values, the display driver 410 is capable of compensating the difference voltages of the corresponding pixel circuits. The aforesaid difference voltages regard the corresponding nodes Q of the far-end region and the near-end region of the display panel 400.

To sum up, in the display driver and the operating method thereof, and the display panel of the embodiments of the disclosure, by providing the initial voltage with different voltage values to the pixel circuits corresponding to various rows of the pixel circuits, the display driver is capable of compensating the voltage differences at the same corresponding node among the pixel circuits. Therefore, during the skip frame, the pixel circuits arranged at different regions (e.g., the far-end region and the near-end region) is capable of keeping the current display screen without flicker. As such, the display driver is capable of reducing the flicker and improving the uniformity of the display screen.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An operating method of a display driver, for driving a display panel which comprises a plurality of pixel circuits arranged in a plurality of display lines, comprising:

providing, by the display driver, an initial voltage that drives the display panel with a reference value to the plurality of pixel circuits, during at least one active frame; and providing, by the display driver, the initial voltage with a plurality of different voltage values to the plurality of pixel circuits to drive the display panel, during at least one skip frame, wherein the plurality of different voltage values of the initial voltage respectively correspond to a plurality of distances between the plurality of display lines and the display driver, wherein the plurality of different voltage values of plurality of different voltage values of the initial voltage respectively correspond to a plurality of distances between the plurality of display lines and the display driver are not driving the display panel during the active frame.

2. The operating method according to claim 1, wherein absolute values of the plurality of different voltage values of the initial voltage and the plurality of distances between the plurality of display lines and the display driver have a positive correlation.

3. The operating method according to claim 1, wherein providing the initial voltage with the plurality of different voltage values to the plurality of pixel circuits during the at least one skip frame comprises:

providing, by the display driver, the initial voltage with a first voltage value to a first pixel circuit of the plurality of pixel circuits, during the at least one skip frame; and providing, by the display driver, the initial voltage with a second voltage value to a second pixel circuit of the plurality of pixel circuits, during the at least one skip frame, wherein the first pixel circuit and the second pixel circuit are arranged in the same column and different rows.

4. The operating method according to claim 3, wherein an absolute value of the first voltage value corresponding to a first display line of the plurality of display lines is greater than an absolute value of the second voltage value corresponding to a second display line of the plurality of display lines, wherein a first distance between the first display line and the display driver is greater than a second distance between the second display line and the display driver.

5. The operating method according to claim 1, wherein among an operating period of the display driver, a number of the at least one active frame is plural, and a number of the at least one skip frame is one, wherein the skip frame is between the plurality of active frames.

6. The operating method according to claim 1, wherein among an operating period of the display driver, a number of the at least one active frame is one, and a number of the at least one skip frame is plural, wherein the plurality of skip frames are continuous and after the active frame.

7. The operating method according to claim 1, further comprising:

providing, by the display driver, the initial voltage with the reference voltage to first pixel circuits of the plurality of pixel circuits corresponding to first display lines of the plurality of display lines, during at least one split-screen active frame;

refreshing, by the display driver, a first part of the display screen corresponding to the first pixel circuits according to the initial voltage with the reference value and a plurality of controlling signals, during the at least one split-screen active frame; and providing, by the display driver, the initial voltage with a plurality of different split-values to the first pixel circuits, during at least one split-screen skip frame, wherein the plurality of different split-values of the initial voltage respectively correspond to the plurality of distances between the plurality of display lines and the display driver.

8. The operating method according to claim 7, wherein among an operating period of the display driver, a number of the at least one split-screen active frame is one, and a number of the at least one split-screen skip frame is plural, wherein the split-screen active frame is between the plurality of split-screen skip frames.

9. The operating method according to claim 8, wherein among the operating period of the display driver, a number of the at least one active frame is one, and a number of the at least one skip frame is one, wherein the skip frame is after the plurality of split-screen skip frames, and is before the active frame.

10. The operating method according to claim 1, wherein the initial voltage with the plurality of different voltage values comprises stepped voltage values.

11. A display driver, comprising:

a digital-to-analog converter (DAC), configured to generate an initial voltage with a reference value, and to generate the initial voltage that drives the display panel with a plurality of different voltage values according to a plurality of distances between a plurality of display lines and the display driver; and an output stage circuit, coupled to the DAC and a plurality of pixel circuits arranged in the plurality of display lines, and configured to output the initial voltage with the reference voltage value to the plurality of pixel circuits, during at least one active frame, and to output the initial voltage with the plurality of different voltage values to the plurality of pixel circuits to drive the display panel during at least one skip frame, wherein the plurality of different voltage values of plurality of different voltage values of the initial voltage respectively correspond to a plurality of distances between the plurality of display lines and the display driver are not driving the display panel during the active frame.

12. A display panel, comprising:

a plurality of pixel circuits arranged in a plurality of display lines;

a digital-to-analog converter (DAC), configured to generate an initial voltage with a reference value, and to generate the initial voltage that drives the display panel with a plurality of different voltage values according to a plurality of distances between a plurality of display lines and the display driver; and an output stage circuit, coupled to the DAC and the plurality of pixel circuits, and configured to output the initial voltage with the reference voltage value to the plurality of pixel circuits during at least one active frame, and to output the initial voltage with the plurality of different voltage values to the plurality of pixel circuits to drive the display panel during at least one skip frame, wherein the plurality of different voltage values of plurality of different voltage values of the initial voltage respectively correspond to a plurality of distances between the plurality of display lines and the display driver are not driving the display panel during the active frame.

* * * * *